Jan. 30, 1962 L. L. SMITH 3,019,299

SWITCHING SELECTOR REPEATER

Filed Aug. 26, 1959 3 Sheets-Sheet 1

*INVENTOR.*
Lester L. Smith

BY C. A. Gulbrandsen
Atty.

INVENTOR.
Lester L. Smith
BY
C. A. Gulbrandsen
Atty.

SWITCHING SELECTOR REPEATER

Filed Aug. 26, 1959

3 Sheets-Sheet 3

INVENTOR.
Lester L. Smith

BY C. A. Gulbransen

Atty.

United States Patent Office 3,019,299

Patented Jan. 30, 1962

3,019,299
SWITCHING SELECTOR REPEATER

Lester L. Smith, McHenry, Ill., assignor to Automatic Electric Laboratories, Inc., a corporation of Delaware Filed Aug. 26, 1959, Ser. No. 836,285
23 Claims. (Cl. 179—18)

This invention relates in general to telephone systems, and more particularly to telephone systems utilizing step-by-step equipment whereby switching selector-repeaters can be employed.

It is an object of this invention to provide a switching selector-repeater designed to distinguish between calls to a distant exchange, to an associated main exchange, or within a sub-exchange (local call) on first, second, third, fourth or fifth digit switching schemes by operation of a rotary switch and the addition of vertical bank wiring.

It is another object of this invention to provide a switching selector-repeater linked incoming to trunking equipment wherein, the digits dialled will simultaneously control this selector-repeater and the trunking equipment and will continue to do so until the type of call being made is distinguished.

It is another object of this invention to provide a switching selector-repeater, as above described, whereby if the call is to a distant exchange or an associated main exchange, this switch will not operate as a selector but functions as a repeater on subsequent digits to an associated selector link.

It is another object of this invention to provide a switching selector-repeater that blocks a call if a required office code is not dialled.

Figure 4:
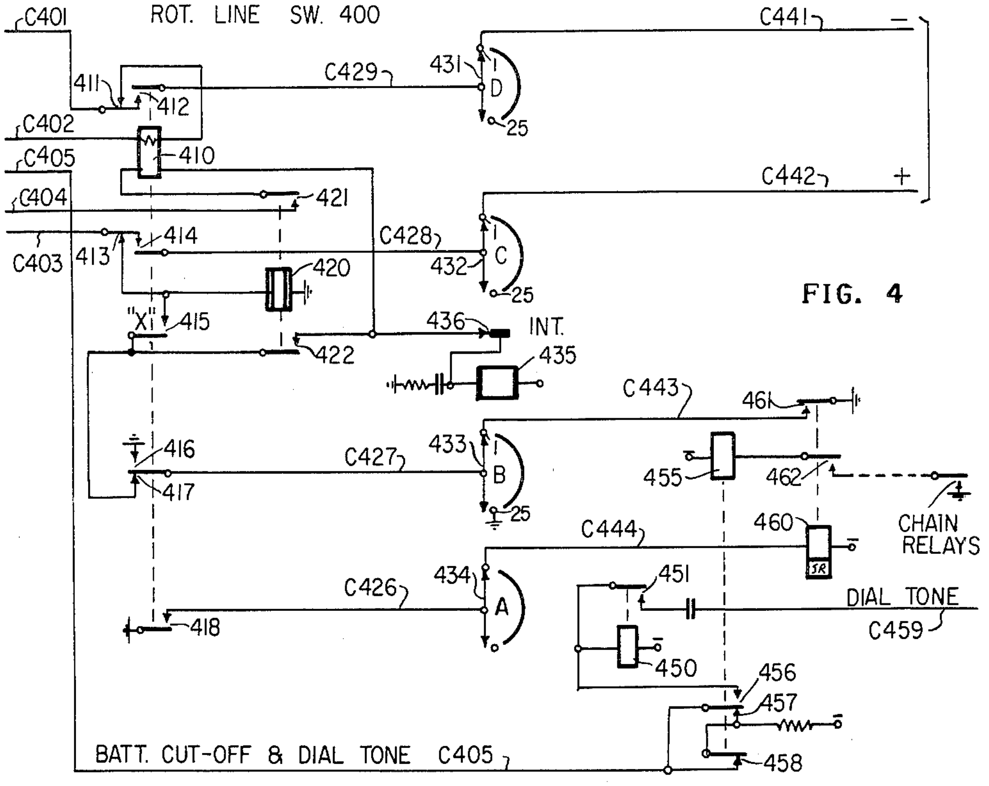
Figure 1:
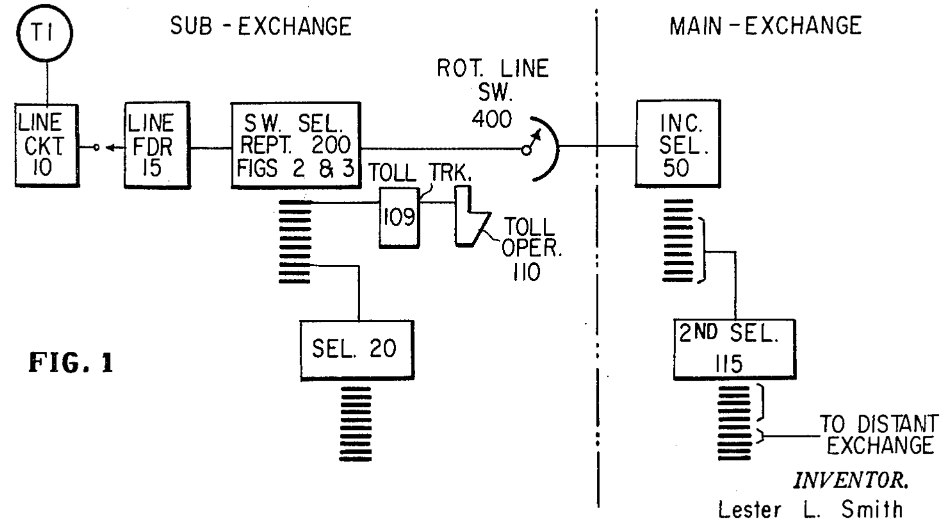
Figure 2:
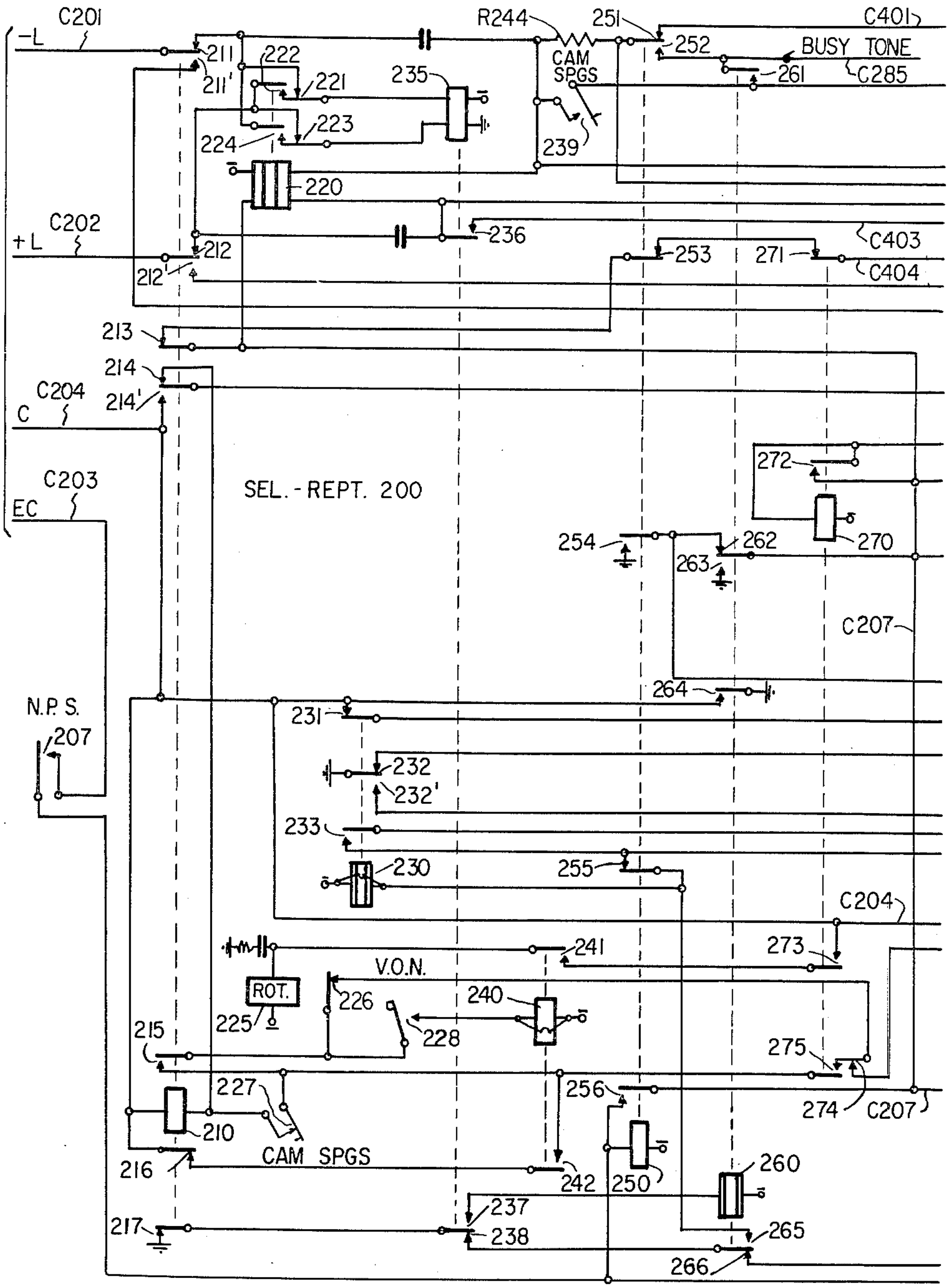
Figure 3:
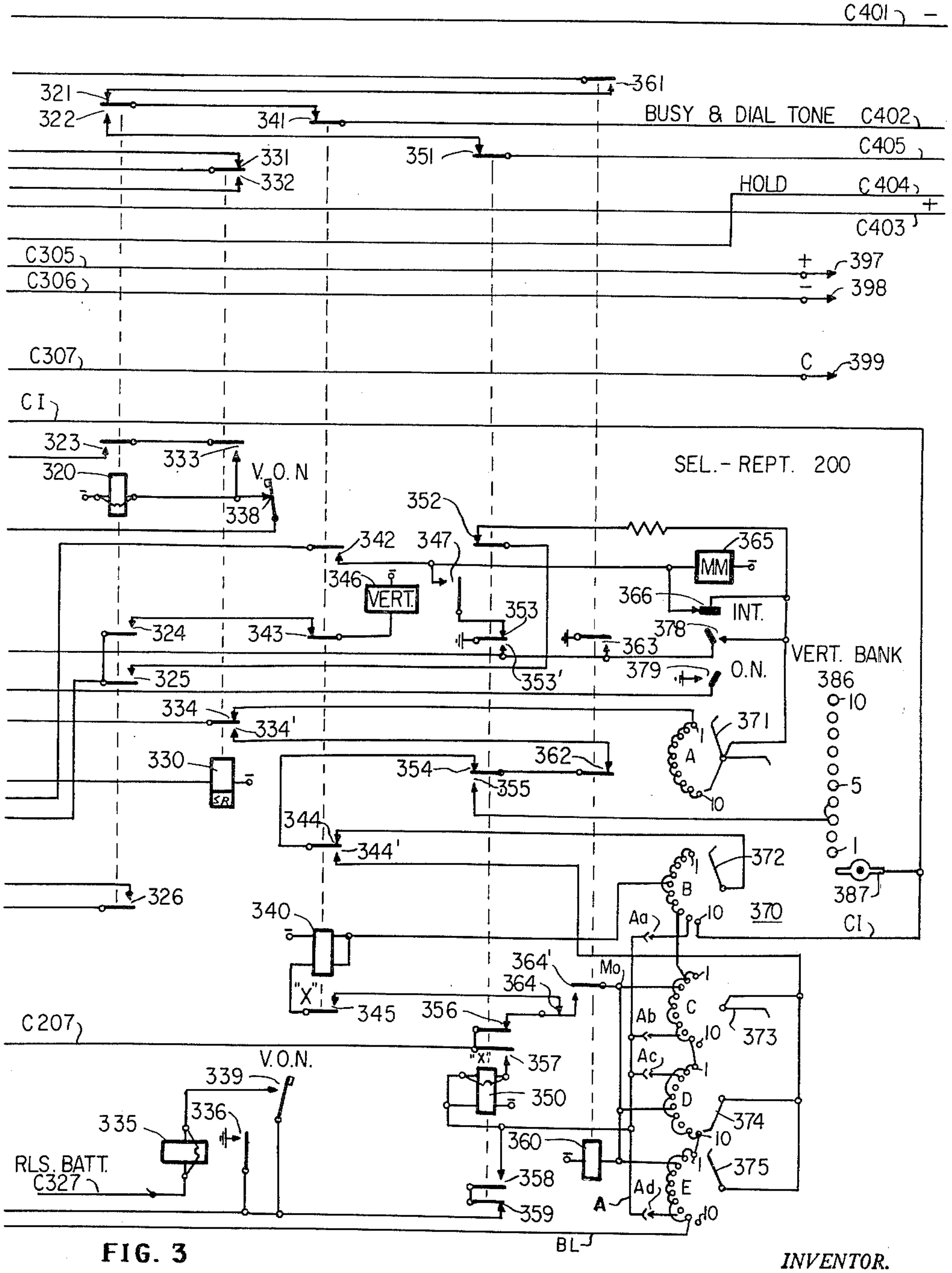

Other objects and advantages of this invention will become apparent from a perusal of the following specification taken in combination with the enclosed drawings of which:

FIG. 1 shows a trunking diagram incorporating the immediate invention;

FIGS. 2 and 3, with FIG. 3 to the right, shows a switching selector-repeater, and FIG. 4 shows a rotary line switch linked outgoing to a switching selector-repeater.

Referring briefly to the trunking diagram of FIG. 1, there is shown a sub-exchange and a main exchange, including trunking equipment in the main exchange accessible to a distant exchange. In the sub-exchange, a calling station T1 having the conventional telephone handset with a dial is connected to a conventional line circuit 10. Also shown is a line finder 15 of conventional design linked incoming to a switching selector-repeater 200 (FIGS. 2 and 3) which will be more fully described in the ensuing description. The switching selector-repeater 200 is in turn linked incoming to a rotary line switch 400 (FIG. 4) which will also be more fully described in the ensuing description. Also shown is a toll trunk 109 linked incoming to a toll operator's position 110, and is accessible via the tenth level of bank contacts on the switching selector-repeater 200. Also, a selector 20 of a conventional two motion design is shown, and will be assumed accessed from the third level of bank contacts on the switching selector-repeater 200. Selector 20 may be a second, third, fourth or fifth selector, and may also be a connector depending on the strapping utilized in the switching selector-repeater 200 to be more fully explained in the ensuing description.

In the main exchange, an incoming first selector 50 of conventional design is shown, and is accessed by a rotary line switch, such as 400, as well as by a line finder (not shown) in the main exchange. Also shown is a second selector 115 of conventional design, which may be accessed from a level on the selector 50.

Referring to FIGS. 2 and 3, the switching selector-repeater 200 comprises thirteen relays, a rotary switch 370 including five levels of bank contacts A, B, C, D and E, and three two-motion wipers 397, 398 and 399 as well as a vertical bank 386 having an auxiliary wiper 387. A motor magnet 365 is utilized for stepping five wipers 371–375 of the rotary switch 370. Vertical and rotary magnets 346 and 225 respectively are utilized for stepping the wipers 397—399 and 387 in a vertical or first direction, and wipers 397—399 in a rotary or secondary direction.

Referring briefly to FIG. 4, the rotary line switch 400 comprises five relays and a rotary magnet 435 for stepping the wipers 431, 432, 433, and 434 in search of an idle trunk. The rotary line switch 400 is a twenty-five contact switch, enabling this switch to test twenty-four bank contacts in search of an idle trunk, with the last or twenty-fifth bank contact designating an all trunks busy condition.

Returning again to FIGS. 2 and 3, the rotary switch 370 in the switching selector-repeater 200 employs the conventional triple arm wipers as shown on level A, namely wiper 371 whereby after one wiper arm disengages the last bank contact the next wiper arm engages the first bank contact in a counter-clockwise direction. Thus, with three wiper arms, there are three normal positions where no wiper arm engages a bank contact. On levels B, C, D, and E of rotary switch 370, two of the wiper arms on each level have been clipped off whereby as shown; wipers 372 and 375 are in a first normal position; wiper 373 is normally in a second normal position; wiper 374 is normally in a third normal position. In other words, levels B, C, D, and E have only one wiper apiece spaced radially at different rotary positions whereby when the wipers 372 and 375 disengage from their set of contacts, the wiper 373 will engage its set, and when the wiper 373 disengages its set of contacts, the wiper 374 will engage its set of contacts.

Connected to predetermined bank contacts on rotary switch 370 are a plurality of conductors designated by the letters AR, A, MO, CI, and BL. These lettered conductors designate AR conductor as "automatic release"; A conductor as "associated"; MO conductor as "main office"; CI conductor as "cut in"; and BL conductor as "blocking." Levels B, C, D, and E of rotary switch 370 are digit checking levels to insure that proper digits have been dialled. More specifically, wiper 372 and level B will check the first digit dialled to determine if this is an "AR" digit, an "A" digit, a "CI" digit, or a "BL" digit whereby the selector-repeater 200 will respond in a manner to be later described. Wiper 373 and level C will check the second digit only if the first digit was an "AR" digit, to determine if this is an "A" digit, an "MO" digit or a "BL" digit. Wipers 374 and 375 will check the third and fourth digits in a similar manner. It should also be pointed out that levels C, D and E of rotary switch 370 also have open contacts which will merely be absorbed and act as indeterminate digits. By this we mean that the succeeding equipment will be affected by this digit but the destination of the call has not as yet been determined, which will be more fully explained in the ensuing disclosure. In contrast, the receipt of an "A" digit does not determine that the call is a local call within the sub-exchange but must be dialled to make a local call; the receipt of an "MO" digit determines that the call is to a main exchange or a distant exchange via the main exchange; the receipt of a "BL" digit determines that an incorrect code has been dialled and the call is to be blocked; and the receipt of a "CI" digit determines that a toll operator is wanted for a toll call.

Before starting the detailed description a list of permissible codes and restricted digits will be given for the subscriber T1. The code or digit "0" is for a toll operator's trunk. The codes for local calls will depend on the strapping utilized, namely straps A*a*, A*b*, A*c*, or A*d* and a ground on certain bank contacts of vertical bank 386. If strap A*a* is utilized the local code would be "93XXXXX" or "94XXXXX" with the letters X designating any number of a seven digit directory number. If strap A*b* is utilized and straps A*a*, A*c*, and A*d* omitted, the codes would be "583XXXX" or "584XXXX." If strap A*c* were utilized and straps A*a*, A*b* and A*d* omitted the codes would be "5633XXX," "5833XXX," "5634XXX" or "5834XXX." If strap A*d* were utilized and straps A*a*, A*b* and A*c* omitted, the codes would be "56333XX," "56334XX," "56883XX," "56884XX," "58383XX," or "58883XX," "58384XX," "58884XX." The codes for main office or distant office via the main exchange will be "53XXXXX," "566XXXX," "586XXXX" if strap A*b* is omitted, "5683XXX," "5633XXX" if strap A*c* is omitted, and "5833XXX" if straps A*b* and A*c* are both omitted. Other main exchange codes will be any digits other than "3" or "4" following an "A" digit. The following digits will block the call only if they do not follow a "CI" digit, an "MO" digit or the combination of an "A" digit followed by a grounded contact on vertical bank 386; the first digits "1–4," and "6–8;" the second digits "1," "2," "4," "5," "7," "9" and "0"; the third digits "1," "2," "5," "7," "9," and "0"; the fourth digits "1," "2," "4–7" and "9."

When the proper digits or code has been received and determined to be a local or a toll call, the switching selector-repeater 200 will respond as a selector and step its wipers 397–399 to search for an idle trunk within the sub-exchange and release equipment in the main exchange that responded to these digits. When the proper digits or code has been received and determined to be a main exchange or distant exchange call, the switching selector-repeater 200 will respond as a repeater to repeat all subsequent digits to trunks in the main exchange while maintaining the wipers 397—399 and 387 in a vertical mechanically locked position and preventing further operation thereof. Also, a set of normal post springs are utilized on the extra control lead C203 in case restricted service is desired. In this case when a restricted subscriber makes a call, ground is placed on the EC conductor, and if he dials a restricted digit, the NP springs will close to block the call. A line circuit for accomplishing this is shown in Patent No. 1,505,963, issued to C. E. Lomax.

Having briefly described the capabilities of the invention, a detailed description of the operations will now follow.

*Seizure of switching selector-repeater*

Assuming that a subscriber at substation T1 (FIG. 1) desires to make a call, the lifting of the handset from the hookswitch will close a loop circuit to the line circuit 10, which in turn, causes an idle line finder 15 to search for the calling line in a well-known manner. Linked outgoing to finder 15 and determining the idle condition of the finder 15, is the switching selector-repeater 200 (FIGS. 2 and 3), with absence-of-ground on control lead C204 marking this switch as idle. With the selector-repeater 200 seized, the loop is extended to a line relay 235 via battery, the upper winding of relay 235, contacts 221, 211, the negative conductor C201, through the calling loop, the positive conductor C202, contacts 212, 223, and the lower winding of relay 235 to ground. Relay 235 operates, closing at contacts 236 a second loop circuit to the rotary line switch 400 (FIG. 4) via the right hand winding of a shunt field relay 220 to be more fully described in the ensuing description. Contacts 237 close an obvious operating circuit to a relay 260. Relay 260 operates, closing contacts 261 to prepare a busy tone to the calling party. Contacts 265 close, to prepare a circuit to relay 230. Contacts 263 close an obvious operating circuit to relay 320 via VON contacts 338, and also closes ground via the conductor C207 through the left hand winding of the shunt field relay 220 to battery. However, the shunt field relay 220 will not operate due to the shunt through the right hand winding. At contacts 264, ground is closed to the control conductor C204 to hold the preceding equipment in a well-known manner.

Relay 320 operates, closing contacts 322 to connect the Battery Cut-Off and Dial Tone lead C405 to the Busy and Dial Tone lead C402 extending to the rotary line switch 400, to be further explained in the ensuing description. Contacts 323 close to prepare locking circuits to relay 320. Contacts 324 and 325 close to prepare circuits to vertical magnet 346 and motor magnet 365 respectively, and contacts 326 close to prepare a circuit to relay 240.

In rotary line switch 400, the line relay 420 operates over the mentioned second loop circuit; the circuit extending from resistance battery, contacts 457, conductor C405, contacts 351, 322, 341 (FIG. 3), the Busy and Dial Tone lead C402, the upper non-inductive winding of relay 410, contacts 411, the negative conductor C401, contacts 251, contacts 331, the right hand winding of shunt field relay 220, contacts 236, the positive conductor C403, contacts 413, and the winding of relay 420 to ground. Relay 420 operates, closing contacts 421 and 422 to prepare a circuit to relay 410. Contacts 421 in closing also prepare a circuit to the rotary magnet 435. If the rotary line switch wipers are standing on an idle trunk (assuming incoming selector 50), an absence of ground engaged by the test wiper 433 will cause the relay 410 to operate from battery through the winding of the rotary magnet 435, contacts 436, the lower winding of the relay 410, contacts 421 to ground on the Hold lead C404. However, if the rotary line switch wipers are on a busy trunk a chain relay, such as 460 corresponding to this trunk will have ground closed at contacts 461 to shunt the relay 410 via the test wiper 433. This ground on the wiper 433 closes a circuit via contacts 417, 422 and 436 to energize rotary magnet 435.

Assuming a busy trunk situation, the energization of the rotary magnet 435 will step the wipers 431—434 to the next set of bank contacts. Also the interrupter contacts 436 will open to deenergize the rotary magnet 435. The deenergization of rotary magnet 435 will reclose interrupter contacts 436, but not before test wiper 433 tests the next trunk. This will continue until an idle trunk is found to operate relay 410 as above described.

When all the outgoing trunks are busy, a toll trunk busy relay 455 of a chain relay circuit operates, wherein chain relays, such as 460, are operated to complete this circuit. In this case contacts 457 and 458 open to remove resistance battery from the lead C405, and at contacts 456 connects ground conductor C405 through to the winding of the relay 450 to battery. Relay 450 operates, closing contacts 451 to connect the dial tone via conductor C459 to conductor C405 to maintain relay 420 operated and send the dial tone back to the calling subscriber informing him to proceed in dialling. If the succeeding digits dialled are to select the outgoing trunk (to the main exchange) the selector-repeater 200 will furnish the busy tone in a manner to be described in the ensuing description.

Assuming however that the relay 410 operates upon the wiper finding an idle trunk, the preliminary make or "X" contacts 415 will close first to lock the relay 420 operated from battery through the winding of the rotary magnet 435. Contacts 416 close ground to test wiper 433 to prevent seizure of this rotary line switch by another selector-repeater. Contacts 418 close ground over conductor C426, wiper 434, seized bank contact, conductor C444, winding of relay 460 to battery. Relay 460 operates, closing ground at contacts 461 to busy the seized outgoing trunk to other incoming calls. At contacts 412 and 414 the second loop circuit is extended to the seized outgoing trunk (selector 50). This loop circuit extending from conductor C441, bank contact and wiper 431, conductor C429, contacts 412, conductor C401, back over the second loop, contacts 414, conductor C428, wiper 432, and conductor C442. Over this last loop circuit, the dial tone is provided from the seized trunk (selector 50) in a well-known manner.

*Toll call—Single digit*

For a toll call by the subscriber T1, the selector-repeater 200 will act as a first digit selector. Under this condition, the wipers of rotary switch 370 will be stepped to a bank contact of level B to conductor CI to initiate the cut-in to the main exchange toll operator's position.

In order to make a toll call, the subscriber at substation T1 must dial the digit "0." Upon receipt of the ten impulses, the line relay 235 will intermittently restore and operate ten times, and at contacts 236 the ten impulses will be repeated to the incoming selector 50 (if seized). Contacts 237 will intermittently open the circuit to relay 260 however, the relay 260 is of the slow-to-release type and will remain operated during pulsing. Contacts 238 will intermittently close a circuit to relay 230 and vertical magnet 346; the first circuit extending from ground, contacts 217, 238, 265 and winding of relay 230 to battery, and the second circuit including contacts 255, 324, 343, winding of vertical magnet 346 to battery. Relay 230 is also of the slow-to-release type and will remain operated during pulsing. The vertical magnet 346 follows the pulses via the contacts 238 and steps the wipers 397, 398, 399, and the auxiliary wiper 387 to the tenth level. During the pulsing of the vertical magnet 346, contacts 347 intermittently close and open an obvious circuit to the motor magnet 365. Motor magnet 365 will thus also step the rotary switch wipers 371, 372, 373, 374, and 375 ten steps in a counter-clockwise direction whereby, the wiper 371 will engage its respective tenth bank contact, and the wipers 372 and 373 will engage their respective tenth bank contacts, while the wipers 372 and 373 will be stepped but due to their normal position will not engage any bank contacts.

Prior to the completion of the stepping operation, relay 230 operates over the above described path opening contacts 231 to prevent ground closed by ON spring contacts 379 when the rotary switch wipers took their first step, from being returned over the control conductor C204. Contacts 232′ close, to complete an obvious circuit to operate relay 330. Contacts 233 close, however without effect at this time. Relay 330 operates opening at contacts 331, the loop circuit to the succeeding equipment and closing, at contacts 332, an alternate path independent of the shunt field relay 220 to improve pulsing. Contacts 333 close a multiple ground to maintain relay 320 operated. Contacts 334′ close to prepare ground to the wiper 372. Also, when the wipers 397—399 take their first vertical step, the vertical off-normal springs operate whereby, VON contacts 228 close a circuit to relay 240 via contacts 226, 274, 326, to ground on the control conductor C204. VON contacts 338 open the operating circuit to relay 320 however, the relay 320 remains operated over the mentioned alternate path. VON contacts 339 close, to prepare a circuit to the release magnet 335. Also, when the rotary switch wipers 371—375 took their first step, the off-normal spring contacts 378 closed to prepare ground to the wiper 371. Relay 240 operates, closing contacts 241 to prepare a circuit to the rotary magnet 225. Contacts 242 close, placing a short circuit through the winding of relay 210.

At the completion of the dialled digit, the line relay 235 reoperates completely, opening at contacts 238 the circuit to the slow-to-release relay 230 and vertical magnet 346. After a short interval, relay 230 restores opening at contacts 232′ the circuit to the slow-to-release relay 330. Contacts 232 close, completing a circuit to relay 270 over a circuit from ground, contacts 232, 334′, 362, 354, 344, wiper 372, tenth bank contact of level B, conductor CI, winding of relay 270 to battery. Contacts 231 close a multiple ground from ON contacts 379 to the control conductor C204 to hold the preceding equipment. Relay 270 operates, closing contacts 272 to lock relay 270 operated via ground on conductor C207. Contacts 271 open to remove the ground from Hold conductor C404 to restore relay 410 in rotary line switch 400 (FIG. 4), if operated, to inturn, restore the seized succeeding equipment (selector 50). Contacts 273 close a circuit to the rotary magnet 225 via battery, winding of rotary magnet 225, contacts 241 and 273 to ground on control conductor C204. Contacts 275 close a holding circuit to relay 240 before contacts 274 open; the circuit extending via battery and winding of relay 240, VON contacts 228, contacts 226, 275, 242, 216, to ground on the control conductor C204. After a short interval slow-to-release relay 330 restores, opening at contacts 333 the holding circuit to relay 320. Contacts 334′ opens the operating circuit to relay 270 however, the relay 270 remains operated over the mentioned locking circuit. Contacts 334 close to complete a circuit to motor magnet 365 via ground, contacts 232, 334, multiplied first to tenth bank of level A, wiper 371, contacts 366, winding of motor magnet 365 to battery. By means of its self-interrupter contacts 366, the motor magnet 365 will step the wipers to their second normal position, wherein magnet 365 restores when wiper 371 disengages the bank contacts. The off normal contacts will not be effected because they only reoperate on a 360° rotation of the wiper. Relay 320 restores, opening at contacts 326 the original operating circuit to relay 240 however, the relay 240 remains operated over the mentioned alternate path.

Rotary magnet 225 energizes, steps the wipers 397—399 to their respective first rotary position or bank contacts in search of an idle toll trunk, and opens its interrupter spring contacts 226 to open the circuit to the relay 240. Relay 240 restores, opening at contacts 241 the circuit to the rotary magnet 225. Contacts 242 open the short circuit to relay 210. The rotary magnet 225 restores, and recloses its interrupter spring contacts 226. If the first bank contact is busy, ground is encountered by the control wiper 399, and is returned via conductor C307, contacts 214, 227, 275, 226, 228, through winding of the relay 240 to battery. Relay 240 reoperates, short circuits the relay 210, and closes the circuit to rotary magnet 225. This relay interrupted rotary stepping continues until an idle trunk is found or the eleventh rotary step is taken.

When an idle toll trunk is found such as 109, an absence-of-ground condition on the C bank contact engaged by control wiper 399 prevents relay 240 from reoperating. Relay 210 is then closed in series with relay 240 over a circuit including battery, wiper 399, conductor C307, contacts 214, winding of relay 210, to ground on the control conductor C204. Relay 240 will not operate due to the high resistance of relay 210. Relay 210 operates, closes contacts 211′ and 212′ to extend the incoming loop circuit to the seized toll trunk on the one hand via conductor C306 and wiper 398, and on the other hand via conductor C305 and the wiper 397. Contacts 211 and 212 open the circuit to relay 235. Contacts 213 open, to further open the circuit to relay 410 in the rotary line switch 400. Contacts 214 open the operating circuit to relay 210 however, contacts 214′ and 215 close and with the change of polarity from the seized toll trunk via wiper C399 to hold the preceding equipment, relay 210 remains operated. This last circuit extending from ground, wiper 399, conductor C307, contacts 214′, conductor C204, winding of relay 210, cam contacts 227, contacts 215, 228, winding of relay 240 to battery. Contacts 217 open the circuit to relay 260. Relay 235 restores and at contacts 236 further opens the circuit to the rotary line switch 400. Relay 260 restores, opening at contacts 263 the circuit to relay 270. No further operation occurs in this switch until the call is released.

The seized idle toll trunk 109 linked with the toll operator's position 110 will thus converse with the calling subscriber to extend the call to the party wanted in a well-known manner.

*All trunks busy condition*

In the above-described toll call, if control wiper 399 does not encounter an idle trunk on any rotary bank contact, the relay 210 does not operate and the rotary magnet 225 steps the wipers 397—399 to the eleventh rotary position. When the wipers take the eleventh step, the cam springs operate whereby; cam contacts 227 open the circuit to relays 210 and 240; cam contacts 239 close, to connect busy tone via conductor C285, contacts 261, contacts 239 and 211 back over negative conductor C201 to the calling subscriber. Relay 240 restores, opens contacts 241 to restore the rotary magnet 225. The switch is held until the calling party disconnects after receipt of the busy tone.

*Sub-exchange calls*

As previously mentioned sub-exchange calls can be switched through on first, second, third, fourth, or fifth digits providing the correct digits are dialled. A first digit switch through has already been described under the subtitle Toll Call. On other switch through calls, an "A" digit must be dialled to permit switch through on the following digit providing this following digit dialled is a digit which will cause the auxiliary wiper 387 to engage a grounded contact.

Assuming first a second digit switching. In this case the first digit must be an "A" digit or more specifically the digit "9." Also, in this case the strap A*a* would be utilized and straps A*b*, A*c*, and A*d* would be omitted. Upon receipt of the nine digital impulses, the line relay 235 will pulse nine times whereby, the relays 235, 240, and 330 operate, the motor magnet 365 steps wipers 371—375, and the vertical magnet 346 steps the wipers 397—399 and 387 all in a manner previously described.

At the termination of the impulse series, relay 230 restores as previously described, and in this case the wipers 397—399 and the auxiliary wiper 387 are adjacent the ninth level of bank contacts. Rotary wipers 371, 372 and 375 will engage their respective ninth bank contacts. The restoration of relay 230, closes at contacts 232 ground via contacts 334′, 362, 354, 344, wiper 372 and ninth bank contact of level B, strap A*a*, conductor A, lower winding of relay 350 to battery. Relay 350 operates closing its "X" contacts first whereby; the "X" contacts 357 close to lock the relay 350 operated through both windings via conductor C207 to ground at contacts 263; "X" contacts 358 close a circuit to the release magnet 335. This last circuit extending from release battery over conductor C327, winding of release magnet 335, VON contacts 339, contacts 359, 358; conductor A, and to ground via wiper 372. Release magnet 335 energizes, closes contacts 336 to lock magnet 335 operated via VON contacts 339 before contacts 359 open the operating circuit to release magnet 335. Release magnet 335 will thus restore wipers 397—399 and 387 to normal, whereby the VON contacts 339 reopen to deenergize the release magnet 335. VON contacts 228 open to restore relay 240. Slow-to-release relay 330 after a short interval restores, opens at contacts 334′ the original operating circuit to relay 350 however, the relay 350 has locked operated. Contacts 333 opens the circuit to the release relay 320 however, relay 320 reoperates when VON contacts 338 reclose when the wipers return to normal. Relay 350 operates completely, closing at contacts 353′ a homing circuit to the motor magnet 365 via ON contacts 378 and interrupter contacts 366. Contacts 355 close to prepare ground to third and fourth bank contacts of vertical bank 386. Contacts 356 open to prevent any false operation of relay 360. Motor magnet 365 energizes, and by means of its interrupter contacts 366 steps the wipers 371—375 to their respective original normal positions whereby ON contacts 378 opens this homing circuit to deenergize the motor magnet 365. ON contacts 379 also open, to remove one of the multiple ground to the control conductor C204.

The second or determining switch through digit must be a digit whereby the auxiliary wiper 387 will engage a grounded bank contact on the vertical bank 386. This ground will only be found on the third or fourth level, thus requiring a dialled second digit "3" or "4." Upon receipt of the second digit, assuming digit "3," the vertical magnet 346 will step the wipers 397—399 and 387 to their respective third bank contacts in a manner previously described. With relay 350 operated; and having contacts 353 open, the motor magnet 365 will not operate.

When relay 230 restores at the termination of the second digit as previously described, ground is encountered by the vertical wiper 387 to operate the relay 270. This last circuit extending from ground, contacts 232, 334′, 362, 355, third bank contact on vertical bank 386, wiper 387, conductor CI, and winding of relay 270 to battery. Relay 330 after a short interval also restores when contacts 232′ opened, but not before relay 270 locked operated via its contacts 272. Contacts 271 open to remove ground from Hold conductor C404 to release the rotary line switch 400 in a manner previously described. At contacts 275 the previously traced multiple circuit to the relay 240 is closed, to hold relay 240 operated before the relay 320 opens the original operating circuit by opening its contacts 326. At contacts 273 the previously traced circuit to the rotary magnet 225 is closed to rotate the wipers in search of an idle third selector within the sub-exchange, such as selector 20.

The remaining digits will thus be responded to via the equipment through selector 20 in a well-known manner.

Had the second digit been any digit other than "3" or "4." relay 270 would not operate, and when the relay 330 restored the locking circuit to the relay 320 would be opened. Relay 320 in restoring would open at contacts 324 the prepared circuit to the vertical magnet 365. The wipers would thus remain mechanically locked, and would designate a main exchange call which will be more fully described in the ensuing description.

Assuming next a third digit switching through the selector-repeater 200. In this case the strap A*b* would be utilized and the straps A*a*, A*c*, and A*d* would be omitted. The first digit would be the "AR" digit "5"; the second digit would be the "A" digit "8"; and the third digit would be the digit "3" or "4."

Upon receipt of the first dialled digit, the "AR" digit "5," the line relay 235 will respond to pulse the vertical magnet 346 and the motor magnet 365 for stepping their respective wipers in a manner previously described. Wipers 397—399 and 387 will be stepped vertically to their respective fifth level of bank contacts, and the wipers 371—375 will take five rotary steps.

At the termination of the impulse series, relay 230 will restore, closing ground at contacts 232, via contacts 334′, 362, 354, 344, wiper 372, fifth bank contact of level B, conductor AR, and the upper winding of relay 340 to battery. Relay 340 operates, closing its "X" contacts 345 first, to lock relay 340 operated through both windings via contacts 364 and 356 to ground on conductor C207. Shortly thereafter the slow-to-release relay 330 restores, opening at contacts 334′ the original operating circuit to relay 340. Contacts 334 close, to complete the previously traced circuit to the motor magnet 365 thereby stepping the rotary wipers to their respective second normal position. With relay 340 locked operated through both windings, the remainder of the contacts thereof operate whereby, contacts 341 open to disconnect the Busy and Dial Tone lead from the Busy Cut Off and Dial Tone lead. Contacts 342 close to prepare an alternate operating circuit to the motor magnet 365. Contacts 344 opens the prepared ground to wiper 372 on level B, and contacts 344′ close to prepare ground to the wipers 373, 374 and 375 on the levels C, D and E respectively. Contacts 343 open, to prevent the vertical magnet 346 from responding to subsequent dialled digits. Therefore, the wipers 397—399 and the auxiliary wiper 387 will lie adjacent the fifth level of bank contacts until they are later restored in a manner to be described in the ensuing description. Contacts 342 close to prepare a homing circuit for the motor magnet 365.

It should be pointed out at this time that this first dialled digit was repeated to the rotary line switch 400, and to the succeeding equipment (if seized). It is to be understood that the first digit "5" does not determine whether the call is to the sub-exchange or the main exchange. Therefore, if the selector 50 (FIG. 1) was previously seized it would have now stepped to select a succeeding trunk, if found idle.

Upon receipt of the second dialled digit, the digit "8," the line relay 235 will intermittently restore and operate eight times whereby, contacts 238 will intermittently restore to close the circuit to relay 230 and also to energize the motor magnet 365. This last circuit extending from ground, contacts 217, 238, 265, 255, 233 (relay 230 operates and remains operated), contacts 342, and winding of motor magnet 365 to battery. Thus, each time the relay 235 intermittently opens contacts 238, the motor magnet 365 deenergizes. Motor magnet 365 will thus step the wipers 371—375 one step for each energization. Also, the operation of relay 230 recloses at contacts 232′ the circuit to the slow-to-release relay 330. Relay 330 reoperates, and closes contacts 334′ to prepare ground to the wipers 373—375.

At the termination of the second digital impulse series, relay 230 and the motor magnet 365 restore and the wipers 371 and 373 engage their respective eighth bank contacts. A circuit is now closed to relay 350; the circuit extending from ground, contacts 232, 234′, 362, 354, 344′, wiper 373, eighth bank contact of level C, strap *Ab*, conductor A, lower winding of relay 350 to battery. Relay 350 operates, closing its "X" contacts first whereby; "X" contacts 357 close to lock relay 350 operated via ground on conductor C207; "X" contacts 358 closes ground from conductor A to the release magnet 335 via contacts 359 and VON contacts 339. Relay 350 thereafter operates its remaining contacts whereby, contacts 352 open to remove the resistor R367 from across the circuit to motor magnet 365. Contacts 354 open and with the restoration of the slow-to-release relay 330 opening contacts 334′, ground is removed from the wipers 373, 374 and 375. Contacts 355 close to prepare ground to the third and fourth bank contacts on the vertical bank 386. Contacts 353′ close ground via ON contacts 378, interrupter contacts 366 and winding of motor magnet 365 to battery, to home the wipers 371—375 to their first normal position in a manner previously described. Contacts 356 opens the locking circuit to relay 340. Release magnet 335 energizes, closes its contacts 336 to lock operated whereby, the wipers 397—399 and 387 restore to normal thereby restoring the VON springs. VON contacts 339 open to deenergize the release magnet 335. VON contacts 338 close to maintain relay 320 operated. VON contacts 228 open to restore relay 240. Relay 340 restores, opens at contacts 342 a prepared circuit to the motor magnet 365. Contacts 344′ further opens the prepared ground to wipers 373—375. Contacts 343 close to prepare a circuit to the vertical magnet 346. Motor magnet 365 energizes and homes the wipers 371—375 to their first normal position in a manner previously described, to thus open the ON contacts 378 to deenergize the motor magnet 365.

Upon receipt of the determining third dialled digit, the digit "3," line relay 235 will pulse vertical magnet 346 in a manner previously described to vertically step the wipers 397—399 and 386 to their third bank contacts respectively. The wipers will thus rotate over this level in search of an idle trunk in a manner previously described.

Assuming next a fourth digit switching through selector-repeater 200. In this case strap *Ac* would be utilized and straps *Aa*, *Ab* and *Ad* would be omitted. The first digit will be the "AR" digit "5"; the second digit will be a digit corresponding to an open contact on level C, namely "6"; the third digit will be the "A" digit "3"; and the fourth digit will be the digit "3" or "4."

Upon receipt of the first digit, the AR digit "5," the wipers 371—375 would step and the wipers 397—399 and 387 would remain adjacent the fifth level of bank contacts in the manner all previously described above. At the termination of this digit, relays 230, 260 and 340 are operated as previously described, and the wipers of rotary switch 370 are in their second normal position.

Upon receipt of the second digit, the digit "6," line relay 235 will pulse the motor magnet 365 six times in a manner previously described whereby, the wipers 371 and 373 will be stepped to engage their respective sixth bank contacts. In this case, when relay 230 restores at the termination of the impulse series, the ground closed via contacts 232 to the wiper 373 is ineffective since the sixth bank contact on level C of rotary switch 370 is an open contact. When after a short interval the slow-to-release relay 330 restores, this ground is extended via contacts 334 and wiper 371 to energize the motor magnet 365 to step the wipers 371—375 to their third normal position. When wiper 371 leaves the last bank contact, the circuit to the motor magnet 365 is opened to cause deenergization thereof.

Upon receipt of the third digit, the "A" digit "4," line relay 235 will pulse the motor magnet 365 four times in a manner previously described whereby, the wipers 371 and 374 will be stepped to engage their respective fourth bank contacts. In this case, when relay 230 restores at the termination of the impulse series, contacts 232 close ground via contacts 334′, 362, 354, 344′, wiper 374, fourth bank contact on level C of rotary switch 370, strap *Ac*, conductor A, lower winding of relay 350 to battery. Relay 350 operates, closing its "X" contacts first whereby; "X" contacts 357 close to lock relay 350 operated through both windings via ground on conductor C207; and at "X" contacts 358 ground on conductor A is closed to the release magnet 335 via contacts 359 and VON contacts 339. Thereafter, relay 350 operates its remaining contacts whereby contacts 352 opens resistor 367 from across the motor magnet 365. Contacts 354 close to prepare ground to the third and fourth bank contacts of vertical bank 386. Contacts 356 open, to open the locking circuit to relay 340. Release magnet 335 energizes and locks in a manner previously described to restore the wipers 397—399 and 387 to normal. VON contacts 339 open to deenergize release magnet 335; VON contacts 228 opens to deenergize relay 240; and VON contacts 338 close to retain relay 320 operated as previously described. Relay 330 in the meantime restored, and at contacts 334 completes the previously traced homing circuit to the motor magnet 365. Motor magnet 365 energizes and by means of its self-interrupter contacts 366 step the wipers 371—375 to their respective first normal position (as shown in FIG. 3) wherein, ON contacts 378 opens to deenergize the motor magnet 365, and ON contacts 379 open to remove one of the multiple grounds to conductor C204. Relay 340 restores, opening at contacts 342 the prepared pulsing circuit to the motor magnet 365. Contacts 343 close, to prepare a circuit to the vertical magnet 346.

Upon receipt of the fourth dialled digit, the sub-exchange determining digit "3," the line relay 230 will pulse the vertical magnet 346 three times in a manner previously described to step the wipers 397—399 and 387 to the third level of bank contacts. The wipers will thus rotate over this level in search of an idle fourth selector, such as the selector 20, in a manner previously described.

Assuming next a fifth digit switching through the selector-repeater 200. In this case the strap *Ad* would be utilized, and the straps *Aa*, *Ab* and *Ac* would be omitted. The first digit will be the "AR" digit "5"; the second and third digits of the local code are marked by unassigned bank contacts on levels C and D, namely digits "6" and "8" respectively; the fourth digit is the "A" digit "8"; and the fifth digit is the sub-exchange determining digit "3" or "4" corresponding to a marking on vertical bank 386.

Upon receipt of the first two digits dialled, the digits "56," the wipers will step in a manner described above on a four digit switching. At the termination thereof the relays 235, 260, 340 the VON and ON springs are all operated as previously described, and the wipers 397—399 and 387 are adjacent the fifth level of bank contacts, and the wipers 371—375 are in their third normal position.

Upon receipt of the third dialled digit, the digit "8," line relay 235 pulses the motor magnet 365 eight times in a manner previously described whereby the wipers 371 and 374 engage their respective eighth bank contacts. At the termination of the impulse series relay 230 restores, closing ground at contacts 232 to wiper 374 however, the wiper 374 is engaging an open contact and is ineffective. Thus, when the slow-to-release relay 330 restores, this ground is extended via contacts 334 and over wiper 371 to energize the motor magnet 365 in a manner previously described. Motor magnet 365 by means of its self-interrupter contacts 366 will step the wipers 371–375 to their first normal position, and open the ON contacts 378 and 379, to in turn, deenergize the motor magnet 365.

Upon receipt of the fourth digit, the A digit "8," the line relay 235 will pulse the motor magnet 365 eight times to step the wipers 371, 372 and 375 to their respective eighth bank contacts, and upon the first step the ON springs reoperate in a manner previously described. At the termination of the impulse series the relay 230 restores, closing at contacts 232 ground, via contacts 334′, 362, 354, 344′, wiper 375, eighth bank contact on level E, strap *Ad*, conductor A, and lower winding of relay 350 to battery. Relay 350 operates, closing its "X" contacts first to lock operated and complete a circuit to the release magnet 335 in a manner previously described. Relay 330 restores as previously described, and at contacts 334 closes the circuit to the motor magnet 365 which self-interruptedly steps the wipers 371—375 to their second normal position. Release magnet 335 energizes and locks as previously described to return the wipers 397—399 and 387 to normal, which in turn, returns the VON springs to normal. Relay 350 operates completely through both windings in a manner disclosed, and at contacts 356 opens the locking circuit to the relay 340. Contacts 355 close to prepare ground to the third and fourth bank contacts on the vertical bank 386. Contacts 352 and 353 open to prevent the motor magnet 365 from responding to the next dialled digit. Relay 340 restores, closes at contacts 343 a prepared circuit to the vertical magnet 346.

Upon receipt of the fifth dialled digit, the sub-exchange determining digit "3," the line relay 235 will pulse the vertical magnet 346 in a manner previously described, to step the wipers 397—399 and 387 to the third level of bank contacts. The rotary action will then proceed to hunt for an idle trunk in a manner previously described.

It is to be understood that during the switch through on first, second, third, fourth and fifth digit switching, the selector 20 was utilized as the succeeding trunk. Thus, in actuality it could be a second, third, fourth or fifth selector, as well as a connector on the fifth digit switching, but only one of these depending on the system utilized, as characterized by the strapping.

*Main exchange and distant exchange calls*

Calls to or via the main exchange are distinguished on the second, third, or fourth digit to the selector-repeater 200 by the bank wiring of the rotary switch 370. Seizure of the selector-repeater by a calling subscriber occurs as previously described. For the distinguishing digit on a call to the main office, the wipers of the rotary switch 370 will be stepped to a bank contact on level C, D, or E wired to lead MO depending upon whether the second, third, or fourth digit distinguishes the call as previously mentioned.

Assuming first a second distinguishing digit switch though, the "AR" digit "5" must be dialled first, followed by the "MO" digit "3" as the second dialled digit. As previously described upon seizure of the selector-repeater 200, the relays 235, 260 and 320 are operated.

Upon receipt of the first dialled digit, the "AR" digit "5," the line relay 235 will intermittently restore and operate five times whereby, contacts 238 intermittently close the previously described circuits to relay 230 and the vertical magnet 346. Contacts 236 intermittently open to repeat the pulses to the incoming trunk (if seized) via the rotary line switch 400. Relay 230 operates, closes at contacts 232′ an obvious circuit to relay 330. Relay 330 operates, closes a locking circuit to relay 320, and prepares ground to the wiper 372 all in a manner previously described. Vertical magnet 346 will energize and deenergize, and by means of its contacts 347 will pulse the motor magnet 365 in a manner previously described. Wipers 397—399 and 387 will thus step vertically to the fifth level of bank contacts, and the wipers 371, 372 and 375 will step to their fifth respective bank contacts all in a manner previously described. Also, upon the wipers 397—399 taking their first vertical step the VON springs operate whereby; VON contacts 228 closes the previously described circuit to relay 240; VON contacts 338 opens the original operating circuit to relay 320 (relay 320 however has locked operated); and VON contacts 339 close to prepare the circuit to release magnet 335. Also, the rotary off-normal springs operate whereby; ON contacts 378 close to prepare a self-interrupter circuit to motor magnet 365; and ON contacts 379 close to prepare a multiple ground to the control conductor C204 all as previously described.

Upon the termination of the impulse series, the relay 230 will restore, and close at contacts 231 a multiple ground from ON contacts 379 to the control conductor C204 to hold the preceding equipment. Contacts 232′ open the circuit to the relay 330 however, the relay 330 is slow-to-release and remains operated a short interval. Contacts 232 close ground, via contacts 334′, 362, 354, 344, wiper 372, fifth bank contact on level B, conductor AR and upper winding of the relay 340 to battery. Relay 340 operates, closing its "X" contacts 345 first to close the previously traced locking circuit to the relay 340. Thereafter, contacts 341 open to prevent any false operation of the relay 410 in the rotary line switch 400. Contacts 342 close to prepare a homing circuit to the motor magnet 365. Contacts 343 open, to prevent operation of the vertical magnet 346 on the succeeding dialled digit. Contacts 344′ close to prepare ground to wipers 373, 374 and 375. After a short duration the relay 330 restores, and at contacts 332 opens the pulsing circuit to the succeeding equipment however, at contacts 331 the loop circuit is maintained closed through the right hand winding of the shunt field relay 220. Contacts 333 open the locking circuit to relay 320. Contacts 334 close the previously traced interrupter circuit to motor magnet 365. Relay 320 restores. Motor magnet 365 will thus energize, and by means of its self-interrupter contacts 366 will step the wipers 371—375 to their second normal position.

It should be recalled here that had the rotary line switch 400 seized an idle trunk, such as the first selector 50, this selector would have responded to the repeated dialled digit and stepped its wipers to the fifth level of bank contacts and rotated in search of an idle second selector. Assuming for the time being that the second selector 115 has been found idle and seized, selector 115 will respond to a second repeated digit in a well-known manner. It should also be recalled that the first dialled digit, the "AR" digit "5" does not determine whether this call is to the subexchange or the main exchange, but is merely a required first digit as will become apparent in comparison to a blocking first digit described under the subtitle Blocking to be described in the ensuing disclosure.

Upon receipt of the second digit, the "MO" digit "3," the line relay 235 will intermittently restore three times, to intermittently close ground at contacts 238 to reoperate the relay 230 and pulse the motor magnet 365 over a circuit including contacts 265 and 233 upon the reoperation of relay 230, 342 and winding of motor magnet 365 to battery. Motor magnet 365 will intermittently energize to step the wipers 371 and 373 to their third bank contacts, while wipers 372, 374 and 375 take three steps but do not engage their respective banks. Relay 230 in operating, closed the circuit at contacts 232′ to operate relay 330. Relay 330 operates, closes contacts 332 to close the previously traced circuit to the succeeding equipment to improve pulsing over the alternate path. Thus, each time the relay 235 closes contacts 236, the seized second selector 115 steps its wipers one step. Contacts 333 close however, without effect. Contacts 334′ close to further prepare ground to wipers 373—375.

At the termination of the second impulse series, the relay 230 restores as previously described, and at contacts 232 ground is closed via contacts 334′, 362, 354, 344′, wiper 373, third bank contact on level C, conductor MO, and winding of relay 360 to battery. Contacts 232′ open the circuit to relay 330 however, the relay 330 remains operated a short interval due to its slow-to-release characteristics. Relay 360 operates, closing its make contacts 364′ first before break contacts 364 open to lock itself operated via contacts 356 to ground on the control conductor C204. Contacts 361 close to prepare busy tone to the calling party. Contacts 362 open, to remove ground to wipers 373—375 and a prepared ground to wiper 371 as well as to relay 360 however, relay 360 has locked operated. Contacts 363 close ground via ON contacts 378, contacts 366 to the winding of motor magnet 365 to cause energization thereof. The break contacts 364 opening after make contacts 364′ closed, opens the locking circuit to the relay 340. Relay 340 restores, closes contacts 341 to further prepare busy tone to the calling party. Contacts 342 opens the prepared circuit to the motor magnet 365. Contacts 343 close, to prepare a circuit to the vertical magnet 346 however, this circuit is still opened at contacts 324 of restored relay 320. Motor magnet 365 by means of its self-interrupter contacts 366 will step the wipers 371—375 to their first normal position whereby the ON springs will restore. ON contacts 378 will open to deenergize motor magnet 365, and ON contacts 379 will open to remove one of the multiple grounds to control conductor C204.

With the circuits open to both the motor magnet 365 and the vertical magnet 346, and the vertical wipers remaining mechanically locked in an off-normal position on the fifth level of bank contacts, the selector-repeater 200 will now act only as a pulse repeater for the succeeding digits dialled.

It would be well to point out at this time, that had the rotary line switch not found an idle trunk after it had been earlier seized, a busy tone would be transmitted back to the calling party after the termination of the "MO" digit. It will be recalled that the first digit, the "AR" digit "5," did not determine the destination of the call (sub-exchange or main exchange) and it would therefore not be desirable to transmit busy tone after that digit. However, the "MO" digit is a determining digit (main exchange call) and a busy tone would now be necessary since no idle trunks were previously found.

Thus, when the relay 360 operated, and the relay 340 restored after receipt of the "MO" digit "3," as above described, the busy tone is transmitted via conductor C285, contacts 261, 361, 321, 341, conductor C402, upper non-inductive winding of relay 410, contacts 411, conductor C401, contacts 251, 331, contacts 211, and back over negative conductor C201 to the calling party at substation T1. Upon receipt of the busy tone, the calling party would proceed to hang up.

Returning now to a completion of the call to a party in the main exchange. When the last digit has been dialled, a connector (not shown) will ring the called party in a well-known manner. When the called party answers, the removal of the handset will reverse the battery back over the incoming loop causing both windings of the shunt field relay 220 to be energized in cooperating directions, to cause operation thereof. The operation of the relay 220 will close its make contacts 222 and 224 before break contacts 221 and 223 to reverse polarity on the loop circuit for supervisory purposes. Conversation would then proceed.

Assuming next a third distinguishing digit for switch through, the "AR" digit "5" must again be dialled first, followed by a second digit corresponding to an open contact on level C of rotary switch 370 namely the digit "6," and the third digit will be the "MO" digit "6." In this case the first two digits make no distinction as to the destination of the call, but the third digit will determine that the call is to the main exchange.

The receipt of the first two digits "56" have previously been described in Sub-Station Calls, and will not be fully re-described. At the termination of the second digit "6," the following relays are operated: 235, 240, 260, and 340. The wipers 397—399 and 387 are mechanically locked on the fifth level of bank contacts, and the wipers 371—375 are in the third normal position as previously described. Also, the pulses have been repeated to the succeeding equipment to seize a third selector.

Upon receipt of the third digit, the "MO" digit "6," the line relay 235 will pulse the motor magnet 365 in a manner previously described to step the wipers 371 and 374 to their respective sixth bank contacts. Relay 360 will operate when the relay 230 restores at the termination of the impulse series over a circuit including ground, contacts 232, 334′, 362, 354, 344′, wiper 374, sixth bank contact on level D, conductor MO, winding of relay 360 to battery. Contacts 361 close to prepare busy tone to the calling party. Contacts 364′ close to lock the relay 360 operated as previously described. Contacts 364 open the locking circuit to the relay 340 to cause restoration thereof. Contacts 363 close the homing circuit to the motor magnet 365, which energizes to step the wipers 371—375 to their first normal position and opens the ON springs in a manner previously described. Relay 340 in restoring, opens at contacts 342 the prepared operating circuit to the motor magnet 365.

With the circuits open to both the motor magnet 365 and the vertical magnet 346, and the vertical wipers remaining mechanically locked in an off-normal position on the fifth level of bank contacts, the selector-repeater 200 will now only act as a pulse repeater for the succeeding digits dialled. The call will be completed in a well-known manner.

Assuming next a fourth distinguishing digit for switch through, the "AR" digit "5" must again be dialled first, followed by a second and third digit corresponding to open contacts on levels C and D of rotary switch 370, namely the digits "6" and "8" respectively, and the fourth digit will be the "MO" digit "3." In this case the first three digits make no distinction as to the destination of the call, but the fourth digit will determine that the call is to the main exchange or a distant exchange.

The receipt of the first three digits "568" have previously been described in Sub-Station Calls, and will not be fully re-described. At the termination of the third digit "8," the following relays are operated: relays 235, 240, 260, and 340. The wipers 397—399 and 387 are mechanically locked on the fifth level of bank contacts, and the wipers 371—375 are in the first normal position as previously described. Also, the pulses have been repeated to the succeeding equipment to seize a fourth selector in a well-known manner.

Upon receipt of the fourth digit, the "MO" digit "3," the line relay 235 will pulse the motor magnet 365 in a manner previously described to step the wipers 371, 372 and 375 to their respective third bank contacts. Relay 360 will operate when the relay 230 restores at the termination of the impulse series over a circuit including ground, contacts 232, 334′, 362, 354, 344′, wiper 375, third bank contact on level E, conductor MO, and winding of relay 360 to battery. Relay 360 will operate to close and open the previously described circuits, whereby subsequent digits will be repeated to the succeeding equipment without further response by magnets 346 and 365.

It will be recalled that in dialling an "A" digit, the destination of the call was not determined (main or sub-exchange). If the digit following the "A" digit is not the digit "3" or "4" whereby ground would be engaged by auxiliary wiper 387, the wipers would mechanically lock and the call would be extended via the main exchange.

Assuming first the utilization of the A*a* strap and the omission of straps A*b*, A*c*, and A*d*, at the termination of a first "A" digit "9" the following relays are operated as previously described; relays 235, 260, 320 and 350. The wipers 371—375 are in their first normal position, and the wipers 397—399 and 387 have restored to normal all as previously described.

Assuming the receipt of a second digit "5" the line relay 235 will pulse the vertical magnet 346 five times to vertically step the wipers 397—399 and 387 adjacent to their fifth level of bank contacts. Relay 350 being operated, and having contacts 353 open, the motor magnet 365 will not respond to digital impulses. At the termination of this impulse series, when the relay 230 restores the ground will be extended to the third and fourth bank contacts on vertical bank 386, but the wiper 387 is engaging the fifth bank contact. Thus, when the slow-to-release relay 330 restores after a short duration, contacts 333 open the locking circuit to the relay 320. Relay 320 restores, and at contacts 324 the prepared circuit is opened to the vertical magnet 346. Contacts 326 open the circuit to relay 240. Relay 240 restores, and at contacts 241 further opens the circuit to the rotary magnet 225. Thus, all subsequent digits will be repeated by the line relay 235 to equipment in the main exchange, without further affecting the wipers 397—399 or wipers 371—375.

Although only the above example is going to be described, it is to be understood that anytime an "A" digit is dialled utilizing any of the straps A*a*, A*b*, A*c*, or A*d*, if the following digit is not "3" or "4," the wipers 397—399 and 387 will vertically lock operated and the call will be extended via the main exchange in a manner described above. These digits would therefore correspond to a main exchange or distant exchange code.

*Blocking*

The calling subscriber's call is blocked when the prescribed sub-office or main exchange codes are not dialled. Conductor BL is wired to certain unassigned bank contacts of levels B, C, D, and E of the rotary switch 370 for this purpose. The blocking "BL" digits are; the first digits "1–4," and "6–8"; the second digits "1–2," "4–5," "7," and "9"; the third digits "1–2," "5," "7," and "9–0"; the fourth digits "1–2," "4–7," and "9." These digits will not block a call if they follow a "CI" digit, an "A" digit, or an "MO" digit as previously described.

Assuming first a single digit blocking, which comprises any first digit other than the digits "5," "0," or if the strap A*a* is utilized, the digit "9." For example, upon receipt of the first digit "3," the line relay 235 will pulse the vertical magnet 346 three times in a manner previously described, and by means of its interrupter contacts 347 the vertical magnet 346 will pulse the motor magnet 365 three times all as previously described. At the termination of the impulse series, when relay 230 restores as previously described, a circuit will now be closed to the blocking relay 250; the circuit extending from ground, contacts 232, 334′, 362, 354, 344, wiper 372, third bank contact on level B, the multipled BL conductor through levels B, C, D, and E of the rotary switch 370, and the winding of relay 250 to battery. Relay 250 operates, closes at contacts 256 a locking circuit for itself to ground on conductor C207. Contacts 251 open, to open the loop circuit to the succeeding equipment to cause restoration thereof. Contacts 252 close, to extend busy tone to the calling subscriber via conductor C285, contacts 252, 331 (which closes after slow-to-release relay 330 restores), 211 and back over negative conductor C201 to the calling subscriber. Contacts 253 open, to open the holding circuit to relay 410 which restores. Contacts 254 close ground, via ON contacts 378, contacts 366 to the winding of motor magnet 365. Contacts 255 open the prepared circuit to the vertical magnet 346. Motor magnet 365 energizes and by means of its self-interrupter contacts 366 steps the wipers 371—375 to their first normal position. The ON springs restore whereby ON contacts 378 open, to deenergize the motor magnet 365, and the ON contacts 379 open to remove one of the multiple grounds to the control conductor C204.

Upon receipt of the busy tone, the calling party will proceed to hang up to release the equipment in a well-known manner.

Assuming next a second digit blocking. In this case a correct first digit code would have to be dialled or the call would be blocked as above on the first digit. The first digit would have to be the "AR' digit "5," whereby at the termination thereof relay 340 will operate and lock as previously described. Also, at this time the relays 235, 240 and 260 are operated; the wipers 371—375 are in their second normal position and the wipers 397—399 and 387 are mechanically locked on the fifth vertical level of bank contacts.

Upon receipt of a blocking second digit, assuming the digit "9," the line relay 235 will pulse the motor magnet 365 over the previously described circuit to step the wipers 371 and 373 to their respective ninth bank contacts. At the termination of this impulse series, when relay 230 restores, a circuit is closed to the blocking relay 250; the circuit extending from ground, contacts 232, 334′, 362, 354, 344′, wiper 373, ninth bank contact on level D of rotary switch 370, through the multiple strapping of levels D and E, conductor BL, and winding of relay 250 to battery. Relay 250 operates, and locks through its contacts 256 as above described. Contacts 251 and 253 open the loop circuit to the succeeding equipment, contacts 252 close to return busy tone, and contacts 254 close the homing circuit to the motor magnet 365 in the manner above described. Also, contacts 255 open to prevent the motor magnet 365 from responding to any subsequent digits dialled. Thus, the calling subscriber upon receipt of the busy tone will proceed to hang up to release the equipment in a well-known manner.

A third digit blocking would occur when after dialling a first "AR" digit "5" and a second digit "6" (open contact on level C), the third digit is a blocking digit "1," "2," "5," "9" or "0." The same operations as above described would occur, except that the circuit to blocking relay 250 would be closed through the wiper 374 in this case.

A fourth digit blocking would occur when after dialling a first "AR" digit "5" and a second and third digit "6"

and "4" respectively (open contacts on levels C and D respectively), the fourth digit is a blocking digit "1," "2," "4-7" or "9." The same operations as above described would occur, except that the circuit to the blocking relay 250 would be closed through wiper 375.

*Restricted service levels*

The normal post springs can be adjusted to operate on single digit cut-in levels so that certain subscriber lines which project ground over the associated extra control EC lead are restricted from accessing these levels. A ground projected over an EC lead by a restricted subscriber as mentioned is disclosed in Patent No. 1,505,963.

Assuming that it is desired to restrict a restricted subscriber from making a toll call. It is to be recalled that in order to make a toll call, the digit "0" must be dialled. Upon receipt of the ten impulses from the calling party's dial, the line relay 235 will pulse the vertical magnet 346 ten times, which in turn, pulses the motor magnet ten times to vertically step the wipers 397—399 and 387 to their tenth level of bank contacts, and the wipers 371 and 372 will be stepped to engage their respective bank contacts in a manner previously described. Upon the wipers 397—399 being stepped to the tenth level the normal post spring contacts 205 will close the ground from EC conductor C203 to operate the blocking relay 250. Relay 250 will thus operate before the slow-to-release interval restores relay 230. Thus relay 250 in operating closes at contacts 254 the homing circuit for the motor magnet 365 to step the wipers 371—375 to their first normal position before the release of relay 230 at contacts 232 was able to close the circuit to relay 270 via the tenth bank contact of level B of rotary switch 370. At contacts 252 the previously traced busy tone will be closed to the calling subscriber for notification that the call cannot be made.

The normal post springs could be adjusted to operate on any desired level and operate in the same manner to restrict the calling restricted party.

*Release*

When a calling party releases upon receipt of a busy tone from the switching selector-repeater 200, the restoration of the handset thereat opens the loop circuit to the line relay 235. Relay 235 restores, and at contacts 236 the loop circuit to the succeeding trunk is further opened. Contacts 237 opens the circuit to the slow-to-release relay 260. At contacts 238, a ground circuit is closed to the relay 230 via contacts 265 however, without effect at this time. After a short duration the relay 260 restores, and at contacts 263 opens the ground from conductor C207 to restore the relay 250. Contacts 264 open to remove holding ground from control conductor C204 to release the preceding equipment. At contacts 266 ground is closed via contacts 217 and 238 and VON contacts 339 to the release magnet 335. Release magnet 335 energizes closing its contacts 336 to lock itself operated, to restore the wipers 397—399 and 387 to normal. VON contacts 339 open to deenergize the release magnet 335. Switching selector-repeater 200 is now at normal.

On the termination of a call to the main exchange, when the called party disconnects first, the polarity of the incoming loop is returned to normal, causing shunt field relay 220 to restore. Relay 220 in restoring returns normal battery polarity via the windings of relay 235 to the calling loop.

When the calling party disconnects, the loop circuit to the line relay 235 is opened. Relay 235 restores, further opens at contacts 236 the succeeding loop circuit. Contacts 237 open the circuit to the relay 260. Relay 260 restores after a short interval, opening at contacts 263 the locking circuit to the relay 350. Contacts 264 open to remove ground from the control conductor C204 to release the preceding equipment. Contacts 266 close, to extend ground to the release magnet 335. Relay 350 restores. Release magnet 335 energizes and locks as above described to return the wipers 397—399 and 387 to normal. Switching selector-repeater 200 is now at normal.

On the termination of a call to the sub-exchange, when the calling party disconnects, the loop circuit is opened to the succeeding equipment causing ground to be removed from the control wiper 399 in a well-known manner. Relay 210 will thus restore, opening at contacts 211' and 212' the loop to wipers 397 and 398. Contacts 217 close ground to the release magnet 335 via contacts 238 and 266 to cause energization thereof. Release magnet 335 will close contacts 336 to lock itself operated, and restore the wipers 397—399 and 387 to normal. VON contacts 339 will thus open to deenergize the release magnet 335. Switching selector-repeater 200 is now at normal.

What is claimed is:

1. In a telephone system, a sub-exchange and a main exchange, a calling station in said sub-exchange, a switching selector-repeater in said sub-exchange, a rotary line switch for extending connections to said main exchange and linked incoming from said selector-repeater, means for extending a loop circuit from said calling station to said selector-repeater, pulsing means in said selector-repeater operative upon extension of said first loop circuit for extending a second loop circuit to said rotary line switch, checking means in said selector-repeater for checking dialled digits repeated by said pulsing means, said pulsing means effective to repeat all dialled digits to trunks via said rotary line switch, a plurality of two motion wipers in said selector-repeater accessible to a plurality of trunks in said sub-exchange, said checking means effective upon the receipt of a repeated first predetermined digit or combination of digits for causing said two-motion wipers to seize an idle trunk in said sub-exchange and releasing said rotary line switch, said checking means effective upon the receipt of a repeated second predetermined combination of digits for disabling said two-motion wipers and said checking means to thereby cause all subsequent dialled digits to be repeated to trunks in said main exchange.

2. In a telephone system, a sub-exchange and a main exchange, a calling station in said sub-exchange, a switching selector-repeater in said sub-exchange, a rotary line switch linked incoming from said selector-repeater, means for extending a first loop circuit from said calling station to said selector-repeater, pulsing means in said selector-repeater operative upon extension of said first loop circuit for extending a second loop circuit to said rotary line switch, switch means in said selector-repeater having different operated positions, said pulsing means responsive to digital impulses received over said first loop circuit for repeating said pulses via said rotary line switch to trunks in said main exchange and for operating said switch means to different operated positions, trunking means in said selector-repeater controlled by certain predetermined positions of said switch means for extending a call within said sub-exchange, a first disabling means for disabling said pulsing means and disconnecting said rotary line switch, a second disabling means for disabling said trunking means, said switch means responsive to a first predetermined series of digital impulses for operating said first disabling means to indicate a sub-exchange call, and said switch means responsive to a second predetermined series of digital impulses for operating said second disabling means to indicate a main exchange call.

3. In a telephone system as claimed in claim 2, including blocking means controlled by certain predetermined positions of said switch means for blocking said call, and said switch means responsive to any one of a third predetermined series of digital impulses to indicate that a non-permissible digit has been dialled.

4. In a telephone system, a sub-exchange and a main exchange, a calling station in said sub-exchange, a switching selector-repeater in said sub-exchange, a rotary line switch linked incoming from said selector-repeater, means for extending a loop circuit from said calling station to said selector-repeater, switch means in said selector-repeater having different operated positions, pulsing means in said selector-repeater responsive to digits dialed over said loop circuit for operating said switch means and extending a second loop circuit via said rotary line switch to said main exchange, trunking means in said selector-repeater controlled by certain predetermined positions of said switching means for extending a call within said sub-exchange, preparing means in said selector-repeater controlled by said switch means responsive to the receipt of a predetermined dialled digit, blocking means in said selector-repeater controlled by said switch means and operated responsive to the receipt of a "BL" digit wherein said "BL" digit comprises either a first, a second, a third, a fourth or a fifth dialled digit of a predetermined numerical value, a first determining means controlled by said switch means responsive to the receipt of a dialled digit of a first predetermined value following the operation of said preparing means to operate said trunking means and disable said rotary line switch for determining that the call is to be via the sub-exchange, and a second determining means controlled by said switch means responsive to the receipt of a dialled digit of a second predetermined value following the operation of said preparing means to continue repeating all subsequent digits received by said pulsing means to the main exchange via said rotary line switch and disabling said trunking means for determining that the call is to the main exchange.

5. In a telephone system as claimed in claim 4, including means effective for disabling said blocking means responsive to the operation of said preparing means to prevent blocking of a call after receipt of said first predetermined dialled digit.

6. In a telephone system as claimed in claim 4, including a source of busy tone connected to said first loop circuit responsive to the operation of said blocking means for notification of an incorrect dialled digit.

7. In a telephone system, a sub-exchange and a main exchange, a calling station in said sub-exchange, a switching selector-repeater in said sub-exchange, a rotary line switch linked incoming from said selector-repeater, means for extending a first loop circuit from said calling station to said selector-repeater, pulsing means in said selector-repeater operative upon extension of said first loop circuit for extending a second loop circuit to said rotary line switch, switch means in said selector-repeater having different operated positions, said pulsing means responsive to digital impulses received over said first loop circuit for repeating said pulses to said main exchange via said second loop circuit and said rotary line switch for extending a connection therein and for operating said switch means to different operated positions, trunking means in said selector-repeater controlled by certain predetermined positions of said switch means for extending a call within said sub-exchange, means effective by said switch means responsive to the receipt of a first dialled digit of a predetermined value for permitting further respondence to subsequent dialled digits, preparing means in said selector-repeater for preparing the operation of said trunking means responsive to receipt of an "A" dialled digit wherein said "A" digit comprises a second dialled digit of a predetermined value, a first disabling means effective to disable said rotary line switch and operate said trunking means to extend a sub-exchange call via said trunking means responsive to the receipt of a dialled digit of a first predetermined value following the receipt of said "A" digit, a second disabling means responsive to the receipt of a dialled digit of a second predetermined value following the receipt of said "A" digit, and said third disabling means responsive to the receipt of an "MO" digit wherein said "MO" digit comprises either a second, a fourth or a fifth dialled digit of a predetermined numerical value or values for extending a main exchange call, said second and third disabling means effective to prevent further respondence of said trunking means.

8. In a telephone system as claimed in claim 7, including blocking means predominate in blocking a call responsive to the receipt of a "BL" dialled digit wherein said "BL" digit comprises an unauthorized digit in the first, second, third, or fourth digital position in the dialled number.

9. In a telephone system, a sub-exchange and a main exchange, a calling station in said sub-exchange, a switching selector repeater in said sub-exchange, a rotary line switch linked incoming from said selector-repeater, means for extending a first loop circuit from said calling station to said selector-repeater, pulsing means in said selector-repeater operated upon extension of said first loop circuit for extending a second loop circuit to said rotary line switch, switch means in said selector-repeater having different operated positions, a two directional trunk selector in said selector-repeater for extending a call within said sub-exchange, said pulsing means responsive to digital impulses received over said first loop circuit for repeating said pulses to said main exchange via said rotary line switch for extending a connection therein, said pulsing means also effective for operating said switching means to different operated positions and for operating said trunking means in a first directional movement, a directional means controlled by a first predetermined operated position of said switch means for operating said trunking means in a second directional movement and for disabling said rotary line switch, a disabling means controlled by a second predetermined operated position of said switch means for disabling said trunking means, said switch means effectively operated to said first predetermined operated position responsive to the receipt of a first plurality of predetermined dialled digits over said first loop circuit to designate a sub-exchange call, and said switch means effectively operated to said second predetermined operated position responsive to the receipt of a second plurality of predetermined dialled digits over said first loop circuit to designate a main exchange call.

10. In a telephone system as claimed in claim 9, including blocking means controlled by any one of a plurality of operated positions of said switch means for blocking a call, said switch means effectively operated to one of said predetermined operated positions responsive to the receipt of one of a plurality of third predetermined dialled digits over said first loop circuit.

11. In a telephone system, a sub-exchange and a main exchange, a switching selector-repeater in said sub-exchange, a rotary line switch linked incoming from said selector-repeater, means for extending a first loop circuit from said calling station to said selector-repeater, pulsing means in said selector-repeater operative upon extending said first loop circuit for extending a second loop circuit to said rotary line switch, switching means in said selector-repeater comprising a plurality of levels of bank contacts and wipers therefor, said pulsing means responsive to successive digits dialled over said first loop circuit for successively operating and releasing said switch means for each received dialled digit to position said wipers from a normal position into successive wiper positions and for repeating said pulses to trunks in said main exchange via said rotary line switch, a two directional trunk selector in said selector-repeater for extending a call within said sub-exchange, said trunking means operated in a first directional movement by said pulsing means, preparing means operated in response to said switching means being operated to position said wipers wherein said switching means will respond to subsequent digits responsive to the receipt of a first dialled digit of a first predetermined numerical value, disabling means operated in response to said switching means being operated to position said wipers in successive different ones of said wiper positions by the receipt of an "MO" dialled digit wherein said "MO" digit comprises either a second, third, or a fourth dialled digit of a second predetermined numerical value, releasing means operated in response to said switching means being operated to position said wipers in successive different ones of said wiper positions by the receipt of an "A" digit wherein said "A" digit is included in a series of predetermined digits, said trunking means returning to normal from its first directional movement responsive to the operation of said releasing means, disconnecting means prepared by the operation of said releasing means for operation by the receipt of a subsequent digit of a predetermined numerical value, said operation of said first disabling means effective to disable said trunking means to determine a main exchange call, said disconnecting means effective to disconnect said rotary line switch and complete a secondary movement of said trunking means to designate a sub-exchange call.

12. In a telephone system as claimed in claim 11, including completing means operative responsive to the secondary movement of said trunking means for disconnecting said pulsing means and closing said first loop circuit directly to said trunks in said sub-exchange whereby said trunks respond directly to subsequent dialled digits.

13. In a telephone system, a calling line, a sub-exchange and a main exchange, a switching selector-repeater, a rotary line switch linked incoming from said selector-repeater, means responsive to a call from said calling line for establishing a connection from said calling line to said selector-repeater, means effective to said established connection for establishing a second connection from said selector-repeater to a trunk in said main exchange via said rotary line switch, means for transmitting a series of successive dialled digits over said connections for further extending connections in said main exchange, a plurality of levels of rotary bank contacts in said selector-repeater for controlling circuits thereover wherein; a first level for marking thereon all digits dialled, a second level for marking thereon all first digits dialled, a third level for marking thereon all second digits dialled, a fourth level for marking thereon all third digits dialled, and a fifth level for marking thereon all fourth digits dialled; homing means controlled through said first level for successively setting up each level for successive markings, a blocking means controlled over circuits through said second, third, fourth, and fifth levels of bank contacts for blocking a call, a disabling relay in said selector-repeater controlled over circuits through certain marked bank contacts on said second, third, fourth and fifth levels of bank contacts for disabling and preventing further markings on said levels of bank contacts and to permit continuation of said connection, trunking means in said selector-repeater comprising a plurality of two directional moving wipers accessible to a plurality of trunks in said sub-exchange and operable in a first directional movement responsive to receipt of any first digit dialled, a disconnecting relay in said selector-repeater controlled over a circuit through a certain marked bank contact on said second level of bank contacts for disconnecting said main exchange trunks, and secondary means effective to the operation of said disconnecting means for operating said two directional wipers in a secondary direction to seize a trunk in said sub-exchange.

14. In a telephone system as claimed in claim 13, including an auxiliary contact bank and wiper operable in a first direction with said two directional wipers, said disconnecting relay controlled over a circuit through certain bank contacts on said auxiliary bank, preparing means controlled over a circuit through a predetermined level and bank contact on said rotary bank for preparing a circuit to said auxiliary bank, and said disconnecting means operable responsive to the said auxiliary wiper engaging one of said certain bank contacts subsequent to the operation of said preparing means.

15. In a telephone system, a calling line, a main exchange and a sub-exchange, a switching selector-repeater in said sub-exchange, a rotary line switch linked incoming from said selector-repeater, means responsive to a call from said calling line for establishing a connection from said calling line to said selector-repeater, means responsive to said established connection for establishing a second connection from said selector-repeater to a trunk in said main exchange via said rotary line switch, means for transmitting a series of successive dialled digits over said connections for further extending connections in said main exchange, a plurality of levels of rotary bank contacts in said selector-repeater for controlling circuits thereover wherein; a first level for marking thereon all digits dialled, a second level for marking thereon all first digits dialled, a third level for marking thereon all second digits dialled, a fourth level for marking thereon all third digits dialled, and a fifth level for marking thereon all fourth digits dialled; homing means controlled through said first level for successively setting up each level for successive markings, blocking means controlled over circuits through said second, third, fourth and fifth levels of bank contacts for blocking a call, trunking means in said selector-repeater comprising a plurality of two directional wipers and an auxiliary wiper with an auxiliary contact bank therefor, said two directional wipers and auxiliary wiper operated in a first direction only responsive to the receipt of any first digit dialled, restoring means effective to restore said wipers and close a marking to a predetermined bank contact on said auxiliary bank responsive to said rotary wipers successively engaging predetermined marked rotary bank contacts upon receipt of a first plurality of predetermined dialled digits corresponding thereto, disconnecting means responsive to said auxiliary wiper engaging said predetermined bank contact on said auxiliary bank following the release of said auxiliary wiper and upon receipt of a second predetermined dialled digit corresponding thereto for disconnecting the extended connection to said main exchange, secondary means effective to operate said two directional wipers in a secondary direction for extending a connection in said sub-exchange responsive to the operation of said disconnecting means, and means responsive to the non-operation of said disconnecting means following the release of said auxiliary wiper and the receipt of a dialled digit other than said second predetermined digit for preventing further respondence by said trunking means on receipt of subsequent dialled digits to indicate a main exchange call.

16. In a telephone system as claimed in claim 15, including a source of busy tone and means for connecting said source as to cause said busy tone to be transmitted back to said calling line upon the completion of a circuit to said blocking means for notification of an incorrect dialled digit upon receipt thereof.

17. In a telephone system, a calling station, a sub-exchange and a main exchange, a switching selector-repeater in said sub-exchange, a rotary line switch linked incoming from said selector-repeater, means responsive to a call from said calling station for establishing a connection from said calling station to said selector-repeater, a plurality of trunks in said main exchange accessible to by said rotary line switch, means responsive to the receipt of digits dialled from said calling station for extending a connection to said main exchange via said trunks, marking means in said selector-repeater for successively marking a maximum of five digits dialled, stepping means in said selector-repeater for extending called connections in said sub-exchange, a first determining means responsive to a succession of predetermined first markings on said marking means upon receipt of a maximum of five dialled digits corresponding thereto for disconnecting said main exchange trunks to cause said selector-repeater to function only as a selector, a second determining means responsive to a succession of predetermined second markings on said marking means upon receipt of a maximum of five dialled digits corresponding thereto for disabling said stepping means to cause said selector-repeater to function only as a repeater.

18. A telephone system as claimed in claim 17, including a first blocking means controlled through said rotary line switch for blocking a call to said main exchange, said blocking means prepared for operation responsive to said rotary line switch failing to access an idle trunk during establishment of the connection from said calling station to said selector-repeater, whereby said blocking means is thereafter operated only responsive to the operation of said second determining means.

19. A telephone system as claimed in claim 18, including a second blocking means responsive to a succession of predetermined third markings on said marking means upon receipt of a blocking digit out of a maximum of five dialled digits for disconnecting said main exchange trunks and said stepping means.

20. In a telephone system, a calling station, a sub-exchange and a main exchange, a switching selector-repeater in said sub-exchange, a rotary line switch linked incoming from said selector-repeater including main exchange trunks accessible thereby, means responsive to a call from said calling station for establishing a connection from said calling station to said selector-repeater, means effective in said rotary line switch responsive to said established connection for causing said rotary line switch to hunt for an idle main exchange trunk for seizure thereof, a marking switch in said selector-repeater comprising means operative responsive to the receipt of successive digits dialled for successively marking certain levels of bank contacts, stepping means in said selector-repeater including trunks therefor for extending a connection to said sub-exchange, a first determining means responsive to receipt of a first-determined digit or digits by said marking switch indicative of a sub-exchange call for disconnecting said rotary line switch, a second determining means responsive to receipt of a second predetermined digit or digits by said marking switch indicative of a main exchange call for disconnecting said stepping means, and a first blocking means controlled through said rotary line switch upon said rotary line switch failing to seize an idle main exchange trunk, said blocking means effective only to the operation of said second determining means following the failure of said trunk seizure for blocking a call thereto.

21. A telephone system as claimed in claim 20, including a second blocking means effective upon receipt of a third predetermined digit or digits by said marking switch indicative of a non-existent directory number for blocking a call.

22. In a telephone system, a calling station, a main exchange and a sub-exchange each having different assigned plural digit directory numbers, a switching selector-repeater, a first switching apparatus for establishing calls from said calling station to said main exchange, a second switching apparatus in said selector-repeater for establishing calls from said calling station to said sub-exchange, means responsive to a call from said calling station for establishing a connection from said calling station to said first switch apparatus, means for transmitting a series of successive dialled digits from said calling station over said established connection to said selector-repeater and said first switching apparatus, a switch in said selector-repeater having a first, a second, a third, a fourth and a fifth wiper, pulse responding means in said selector-repeater operated in response to the receipt of one or more of said directory digits for operating said switch wipers, said second switching apparatus operative responsive to said pulse responding means responding to a first dialled digit for preparing a connection to said sub-exchange, a first circuit for further operating said second switching apparatus over said second wiper in response to the receipt of a first dialled digit of a first predetermined value for extending a connection to said sub-exchange, preparing means for permitting said switch means to respond to subsequent dialled digits, a second circuit for operating said preparing means over said second wiper in response to the receipt of a first dialled digit of a second predetermined value, releasing means for releasing said second switch apparatus and preparing it for reoperation, a third circuit for operating said releasing means over said third wiper in response to the receipt of a second dialled digit of a predetermined value following the operation of said preparing means, a fourth circuit controlled by the operation of said releasing means in response to the receipt of a third dialled digit of a third predetermined value for operating said second switching apparatus in two directions for extending a connection to said sub-exchange, disabling means effective for preventing said switch and said second switching apparatus from responding to subsequent dialed digits responsive to the receipt of any third dialled digit other than said third predetermined valued digit following the operation of said preparing and releasing means.

23. A telephone system as claimed in claim 22, including disconnecting means for disconnecting said first switching apparatus responsive to the extension of a connection to said sub-exchange.

References Cited in the file of this patent

UNITED STATES PATENTS

| | | |
|---|---|---|
| 2,579,721 | Bakker | Dec. 25, 1951 |
| 2,804,503 | Cotroneo | Aug. 27, 1957 |